(12) United States Patent
He (10) Patent No.: US 6,688,547 B1
(45) Date of Patent: Feb. 10, 2004

(54) SELF COMPENSATING INERTIA SENSOR

(75) Inventor: Simon Xunnan He, Troy, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/286,801

(22) Filed: Nov. 4, 2002

(51) Int. Cl.[7] .............................................. B60R 22/40
(52) U.S. Cl. ............................... 242/384.5; 242/384.4; 280/806; 297/478
(58) Field of Search ...................... 242/384.4, 384.5; 280/806; 297/478

(56) References Cited

U.S. PATENT DOCUMENTS

| | | | | |
|---|---|---|---|---|
| 3,905,562 A | * | 9/1975 | Kell ........................ | 242/379.1 |
| 4,135,410 A | * | 1/1979 | Filderman ................... | 74/411.5 |
| 4,164,335 A | * | 8/1979 | Kondziola ............... | 242/384.1 |
| 4,341,360 A | * | 7/1982 | Lindblad ................. | 242/384.4 |
| 4,605,180 A | * | 8/1986 | Fisher et al. ............. | 242/384.2 |
| 4,684,077 A | * | 8/1987 | Kurtti et al. .............. | 242/384.2 |
| 5,495,994 A | * | 3/1996 | Rumpf et al. ............. | 242/384.4 |
| 5,568,941 A | * | 10/1996 | Woydick et al. ............ | 280/806 |
| 5,820,060 A | * | 10/1998 | Yano ........................ | 242/384.4 |
| 6,164,581 A | | 12/2000 | Freeman et al. ......... | 242/384.4 |
| 6,283,553 B1 | * | 9/2001 | Anderson et al. ........... | 297/478 |

* cited by examiner

Primary Examiner—Kathy Matecki
Assistant Examiner—Sang Kim
(74) Attorney, Agent, or Firm—Jarett Rieger (57) ABSTRACT

The inertia sensor is a sensor for a seatbelt retractor used for sensing deceleration. The inertia sensor is composed of a primary mass, a secondary mass, and a lifter. The primary mass provides the inertia for the self compensating function. The secondary mass provides the inertia for sensing deceleration. The inertia sensor is not triggered when subjected to tilting angles of 30 degrees or less in any direction. Upon experiencing decelerating motion, the secondary mass tilts relative to the primary mass whereby this relative angular displacement causes the lifter to raise. The lifter rotates a locking pawl into an engagement position, which initiates the locking mechanism of the seatbelt retractor.

26 Claims, 11 Drawing Sheets

SELF COMPENSATING INERTIA SENSOR

FIELD OF THE INVENTION

The present invention generally relates to seatbelt retractors and in particular relates to inertial sensors utilized therein.

BACKGROUND OF THE INVENTION

A typical seatbelt retractor is designed to be installed within a vehicle at a fixed position such as on the B-pillar or attached to a non-rotatable portion of the seat frame. The seat belt retractor has an inertia sensor or a vehicle sensor, which responds to changes in horizontal vehicle acceleration. The conventional inertia sensor includes a housing having a support surface, an actuator lever, and an inertia mass such as a standing man, ball or weighted member with a lower spherical surface. During non-accelerating or non-decelerating conditions, the inertial mass is at a nominal, typically vertical position aligned to the local gravity vector. The inertia sensor is sensitive to vehicle deceleration. Upon reaching a triggering deceleration, the inertia mass moves upon the support surface and as it does, changes its elevation thus engaging the lever arm. The lever arm or locking pawl is raised into engagement with another retractor part, typically the teeth of a ratchet wheel thus initiating the locking of the retractor spool and preventing further payout of the seatbelt webbing.

The triggering deceleration sensitivity of an inertia sensor is the magnitude of deceleration that will trigger the inertia sensor. The triggering of the inertia sensor is an event whereby the inertia mass moves, which initiates the locking mechanism of the seatbelt retractor. The triggering deceleration sensitivity is measured in acceleration units such as gravity (g), and when a threshold amount of deceleration is reached, the inertia sensor is actuated.

In addition to the inertia sensor being sensitive to deceleration, the sensor is also sensitive to the tilting angle of a vehicle. The tilting of a vehicle brings about a tilting of the seatbelt retractor. If the tilting angle of the vehicle exceeds a threshold, the inertia sensor will actuate. Generally speaking, the more sensitive the inertia sensor is to deceleration, the more sensitive the inertia sensor will be to the tilting angle. In designing an inertia sensor to be unaffected by tilting of 15 degrees in any direction, the minimum value for the triggering deceleration sensitivity is 0.27 g. Thus, in order to prevent the seatbelt retractor from locking under tilting angles of 15 degrees or less, the triggering deceleration sensitivity needs to be 0.27 g or greater. This minimum threshold for triggering deceleration sensitivity presents a problem for the early stage of a braking event that has a low deceleration onset rate such as 0.4 g/s. A deceleration onset rate is defined as the initial rate of deceleration change of a vehicle during braking or a crash. The lower the deceleration onset rate, the longer the time that is required for the deceleration to reach a triggering deceleration level. A long amount of time translates to a significant forward movement of an occupant during the braking event. Under a braking event that has an acceleration onset rate of 0.4 g/s, it will take more than 0.6 seconds for the acceleration to reach a triggering level of 0.276 g and during this time period the occupant will move forward more than 74 mm.

Due to the fact that the tilting angle affects the lower limit on the triggering deceleration sensitivity, there is a need to develop an inertia sensor that is not influenced to changes in tilting.

SUMMARY OF THE INVENTION

The inertia sensor in accordance with the present invention has an inertia sensor consisting of two inertia bodies connected in a way that the two inertia bodies form a 360 degree double pendulum system. The inertia sensor has a self-compensating feature and also senses deceleration. Due to the self compensating feature, the inertia sensor in the present invention is not triggered when the vehicle is subjected to tilting angles of 30 degrees or less. Even though the inertia sensor is not triggered during vehicle tilting, the inertia sensor is triggered during predetermined amount of deceleration.

The inertia sensor in the present invention comprises a primary mass, a secondary mass, and a lifter. The primary mass is responsible for conferring the benefit of the self compensating function on the inertia sensor, while the secondary mass is responsible for triggering the inertia sensor in the event of deceleration. During a braking event or a crash, there is relative angular displacement between the primary mass and the secondary mass resulting in the secondary mass pushing the lifter, which rotates a locking pawl. The rotation of the locking pawl initiates the locking mechanism of the seatbelt retractor.

DETAILED DESCRIPTION OF THE INVENTION

Figure 1:
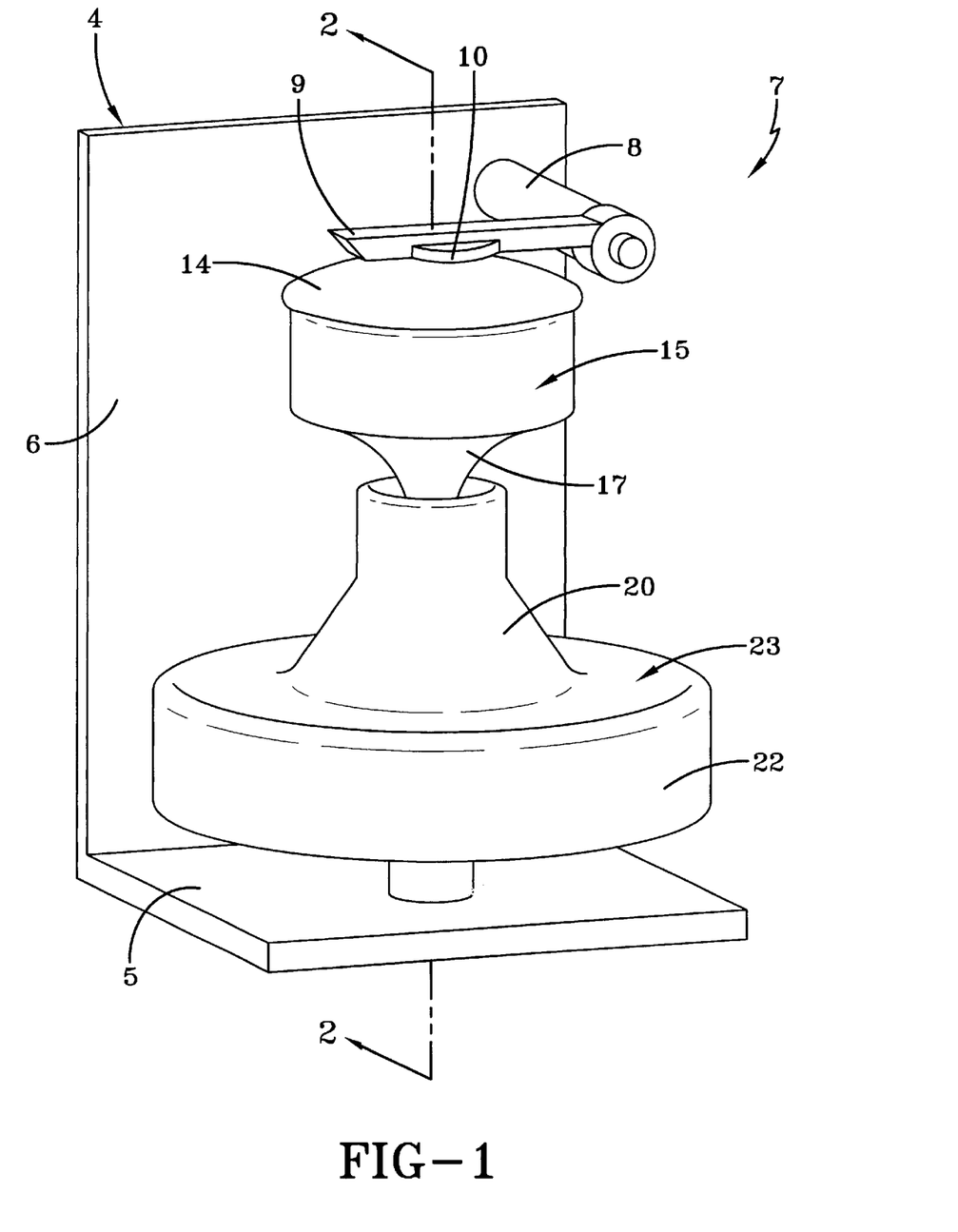
FIG. 1 represents a perspective view of the inertia sensor in accordance with the present invention.

FIG. 1 shows an inertia sensor for use in a seatbelt retractor (not shown). A typical seatbelt retractor is shown in co-owned U.S. Pat. No. 6,164,581, which is incorporated herein by reference. The inertia sensor also known as a vehicle mechanical sensor detects horizontal deceleration, and when the vehicle experiences a predetermined amount of deceleration, the inertia sensor is triggered whereby the pawl 9 is rotated which initiates the locking of the seatbelt retractor. Hereinafter, the term "deceleration" refers to horizontal deceleration, unless otherwise specified The inertia sensor 7 as shown in FIG. 1 is composed of three major components, a primary mass 23 (shown in FIG. 4), a secondary mass 15 (shown in FIG. 5), and a lifter 14 (shown in FIG. 6). The inertia sensor 7 is installed in a seatbelt retractor so that the primary mass 23 is disposed directly below the secondary mass 15 and both masses are level or aligned with the local gravity vector when the vehicle is at rest on a flat surface. The primary mass 23 and the secondary mass 15 have a common central axis that passes therethrough. The inertia sensor 7 according to the present invention is able to compensate for vehicle tilting and has high deceleration triggering sensitivity. The primary mass 23 provides the inertia for self-compensating function and the secondary mass 5 provides the inertia for sensing deceleration. The operation of the inertia sensor will be discussed in detail later.

Figure 4:
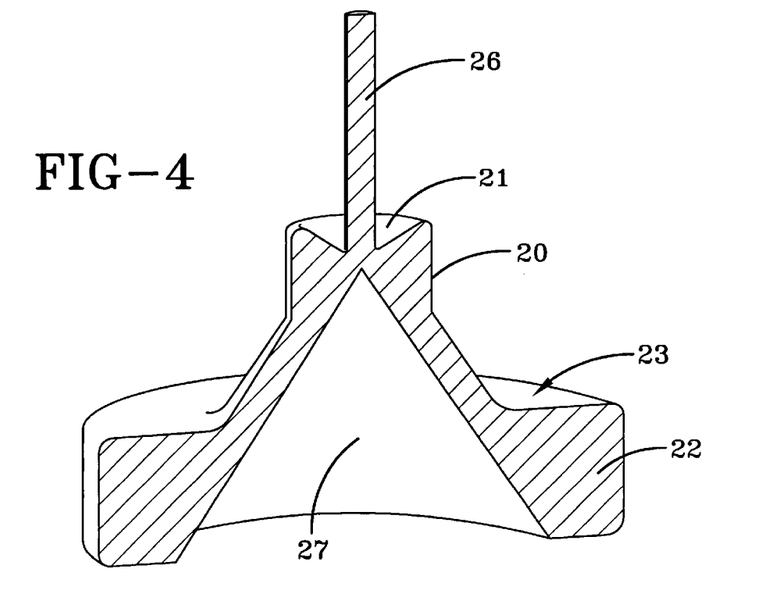
FIG. 4 shows a cross section view of the primary mass from FIG. 1.

The primary mass 23 is composed of a primary metal ring 22, a support member 20, and a lift guide 26. The primary metal ring 22 is made from any heavy metal or metal alloy such as steel and copper. The primary mass has a ring shape, however other shapes may be adopted without departing from the scope of the present invention. The support member is preferably made from a plastic material and is attached to the primary metal ring 22 in the inertia sensor 7 by various methods such as interference fit, gluing, molding, etc. It is contemplated that the primary mass be made from a unitary material, thus eliminating the need for attaching the primary metal ring 22 to the support member 20. The top surface 21 of the support member 20 slopes downward toward the center of the top surface 21 where the lifter guide 26 extends therefrom. The primary metal ring 22 and support member 20 components collectively define a pyramidal void 27 for receiving a post 24. The inner surface of both the primary metal ring 22 and the support member 20 are angled inward and converge to a point.

Figure 2:
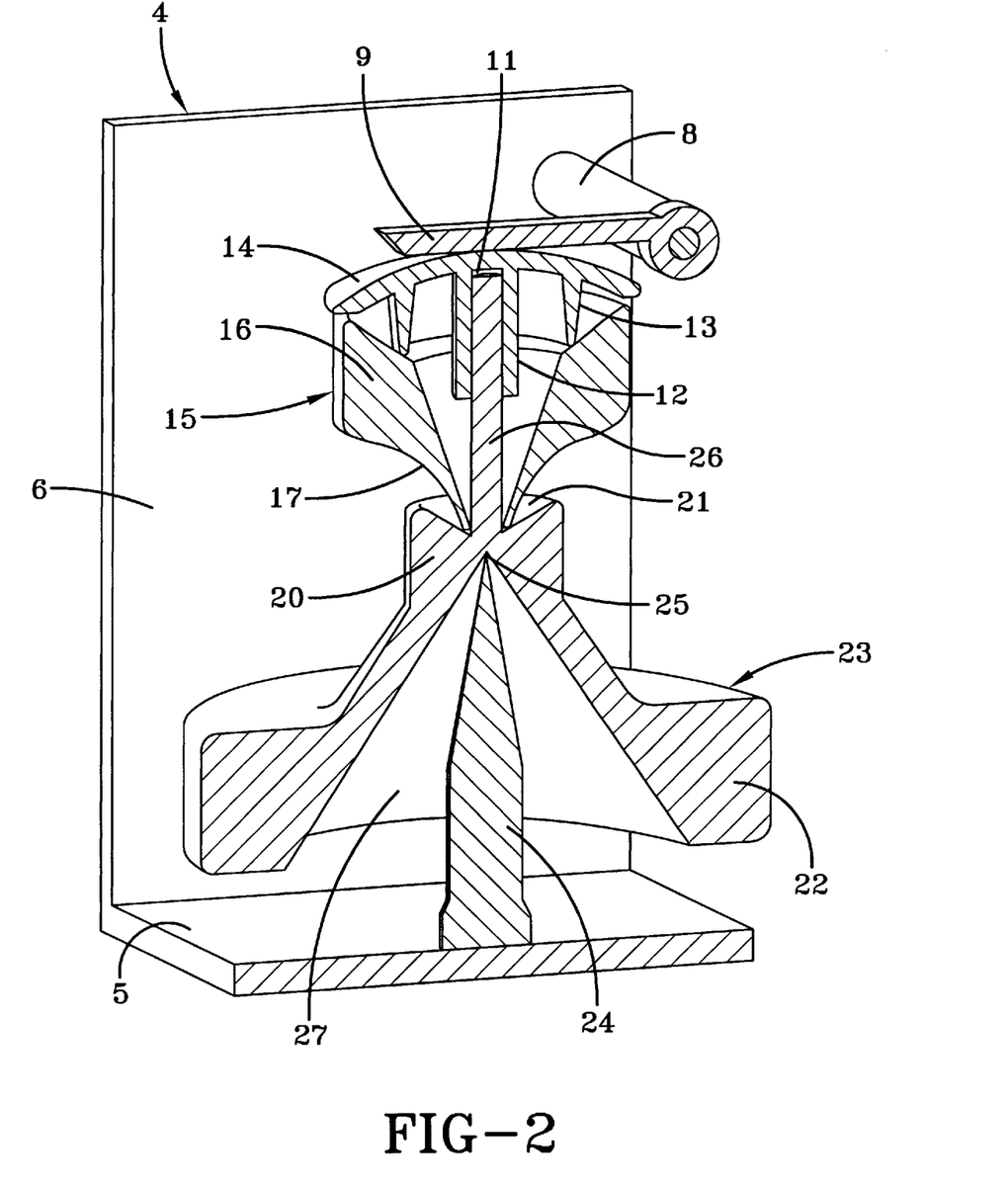
FIG. 2 shows a cross section through section 2—2 of the inertia sensor shown in FIG. 1.

With reference to FIG. 2, a lifter guide 26 extends from the center of the top surface 21 of the support member 20. The lifter guide 26 is made from a plastic material but any other suitable material may be utilized. The purpose of the lifter guide 26 is to limit the movement of the tubular portion 12 of the lifter 14 to a direction parallel with the lifter guide 26. Moreover, the lifter guide 26 guides the movement of the lifter 14 and prevents the lifter 14 from disengaging with the inertia sensor 7. A portion of the lifter guide 26 fits within the tubular portion 12 of the lifter 14 and the lifter guide 26 needs to have the appropriate length whereby a portion of the lifter guide 26 is present within the tubular portion 12 when the lifter 14 is at its maximum height.

Figure 5:
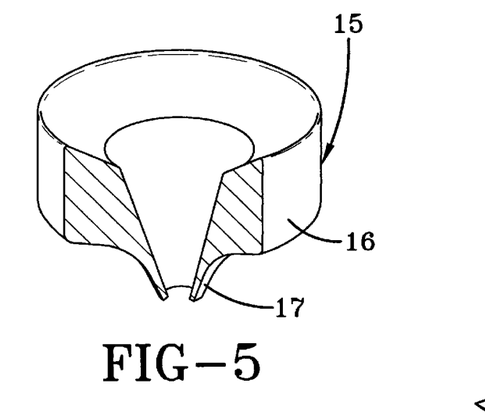
FIG. 5 shows a partial cross section view of the secondary mass from FIG. 1

The secondary mass 15 contains a funnel shaped member 17 and a secondary metal ring 16. The funnel shaped member 17 is preferably made from a plastic material. The funnel shaped member 17 is the portion of the secondary mass 15 that interacts with the support member 20. The funnel shaped member 17 of the secondary mass 15 directly rests on the top surface 21 of the support member 20, which can be best visualized in FIG. 2. Even though the funnel shaped member directly rests on the top surface of the support member, a piece of thermoplastic material may be employed between the two opposing surfaces to reduce noise and or vibration without departing from the scope of the present invention. Additionally, the secondary metal ring 16 is situated above the funnel shaped member 17 and is above the tip 25 of the post 24. The secondary metal ring 16 is made from a metal or a metal alloy and may be connected to the funnel shaped portion by an interference fit, molding, glue, or my any other suitable method. The secondary mass 15 is hollow enabling the tubular portion 12 of the lift to receive the lift guide. Optionally, the secondary metal ring 16 and the funnel shaped member 17 may be made from unitary material.

Figure 6:
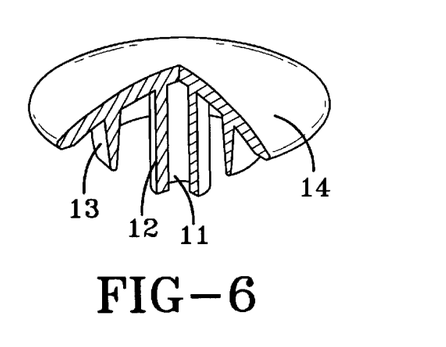
FIG. 6 shows a partial cross section view of a lifter from FIG. 1.

The lifter 14 is the uppermost part of the inertia sensor 7 and has a ring 13 and a tubular portion 12. As displayed in FIG. 1, the lifter 14 has a dome shape configuration bulging in the direction away from the secondary mass 15. The lifter 14 has a ring 13 that extends from the dome shape portion of the lifter 14. When the vehicle is at rest on a flat surface, the bottom of the ring 13 rests on the secondary metal ring 16. When the inertia sensor 7 is subjected to deceleration, the lifter 14 is raised however the ring 13 still remains in contact with secondary metal ring 16.

Figure 3:
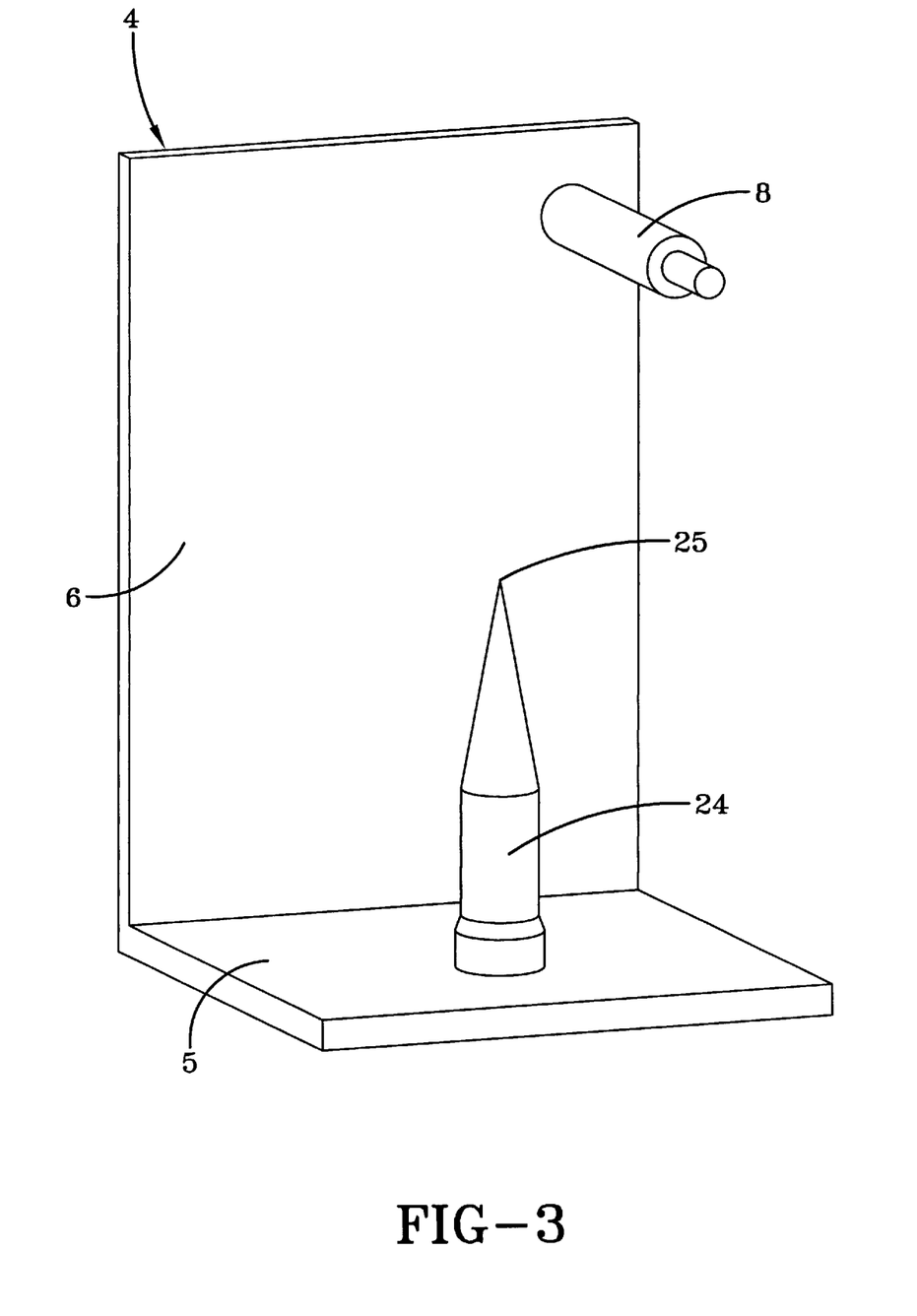
FIG. 3 shows a perspective view of a bracket for attaching the sensor to the seatbelt retractor frame.

The inertia sensor 7 is balanced on a post 24, which is secured to the bracket 4. The bracket 4 is fixedly attached to a seatbelt retractor frame (not shown), which may be either fixed on a seatback cushion or B pillar. With reference to FIG. 3, the post 24 extends from the bottom portion 5 of the bracket 4 and the primary mass 23 rests on top of the tip 25 of the post 24. It is preferable that the primary mass 23 rests on a post 24 having a small spherical tip 25, however, other shaped tips may be employed. The post 24 is long enough and far enough away from the side portion so that when the vehicle is subjected to at least a 30 degrees tilt, the primary mass 23 will not touch any portion of the bracket 4.

Figure 7:
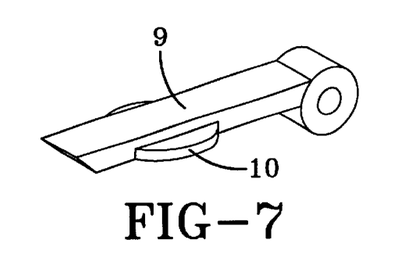
FIG. 7 shows a perspective view of a locking pawl from FIG. 1.

The inertia sensor 7 initiates the locking of the seatbelt by rotating the locking pawl 9 to trigger a locking mechanism of a seatbelt retractor. As seen in FIG. 7, the pawl 9 has a plate 10 attached thereto for facilitating the mechanical communication between the pawl 9 and the lifter 14. The pawl 9 is rotatably connected to an axle an-axle 8, which is attached to a side portion 6 of the bracket 4.

Figure 8:
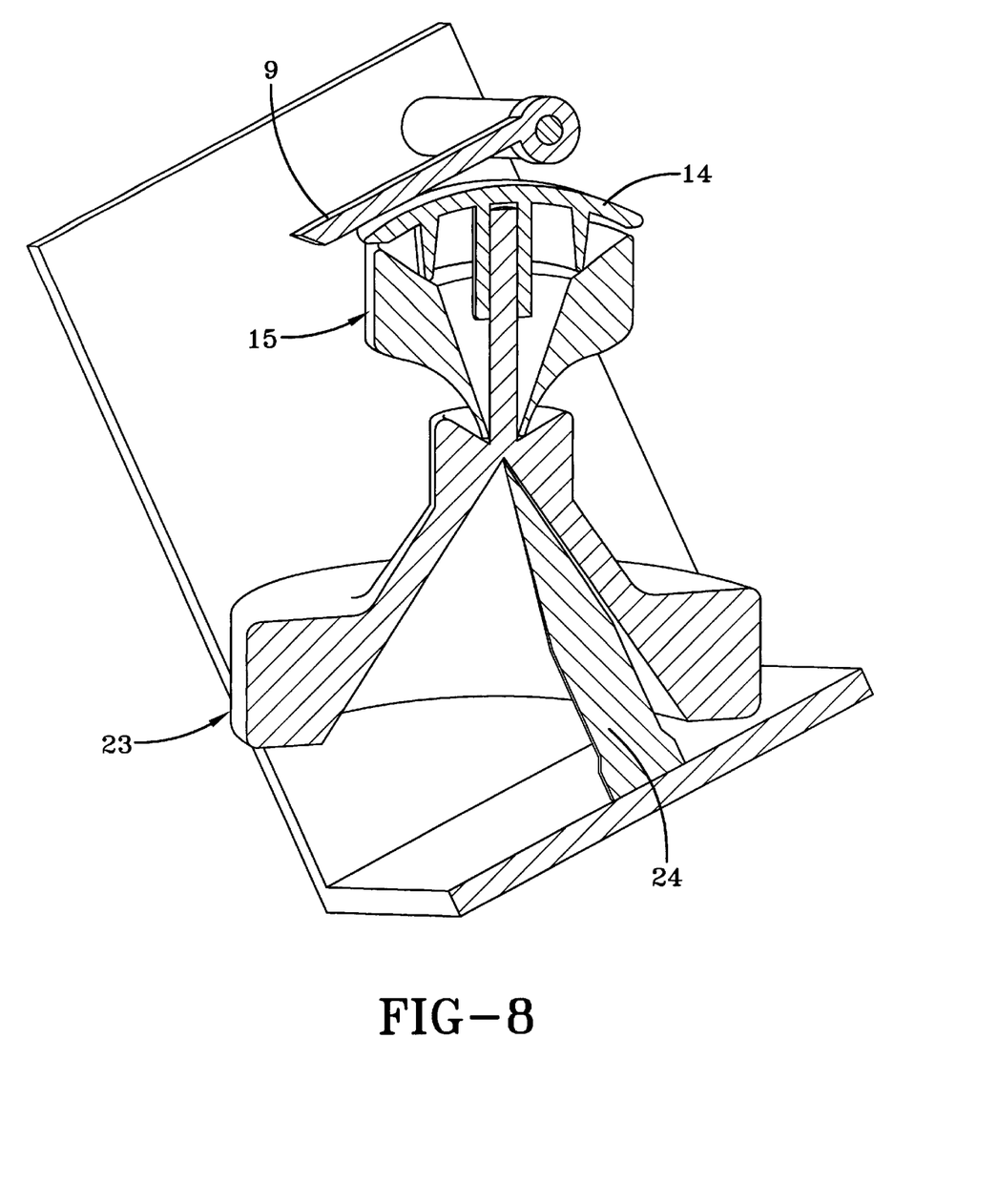
FIG. 8 shows the inertia sensor from FIG. 1 subjected to a tilting angle.

An advantage of the present invention is the self compensating feature of thirty degrees tilting in any direction. The inertia sensor 7 in accordance with the present invention is designed to have 30 degrees self compensating feature, however, one skilled in the art will be able to modify the level of self compensation by changing the geometry and mass of the primary mass 23. Because of the self-compensating feature, the vehicle can be tilted up to 30 degrees in any direction without the inertia sensor 7 being triggered. FIG. 8 shows the self-compensating feature of the present invention whereby the vehicle and the seatbelt retractor bracket 4 are at an angle while the inertia sensor 7 remains parallel with the gravity vector or essentially in the position assumed when the retractor bracket 4 was not at an angle. The angle of the retractor bracket 4 in FIG. 8 is a representative angle and the inertia sensor 7 will exhibit the same self-compensating feature in any direction up to 30 degrees.

As discussed earlier, the primary mass 23 provides the inertia for the self-compensating function. The inertia sensor 7 in the present invention is designed so that the primary mass 23 constitutes the bulk of the mass in the inertia sensor 7 thereby providing the requisite mass to prevent the inertia sensor 7 from tilting when the retractor bracket 4 is subjected to an angle. When the vehicle is subjected to a tilting angle, the retractor bracket 4 including the locking pawl 9 tilts therewith. Due to the dome or contour shape of the lifter 14, the inertia sensor 7 will not apply a torque on the locking pawl 9 when the vehicle is tilted up to 30 degrees. Thus, due to the shape of the lifter 14 of the inertia sensor 7, the inertia sensor 7 will only apply a torque on the locking pawl 9 causing rotation thereof when the lifter 14 is lifted. The lifter 14 is lifted during braking events and is not lifted when the inertia sensor 7 is subjected to a tilting angle. When the seatbelt bracket 4 is not at an angle, than the post 24 is situated in essentially the center of the pyramidal void 27. As the seatbelt bracket 4 is subjected to increasing angles, the post 24 moves further and further away from the center position.

Figure 9:
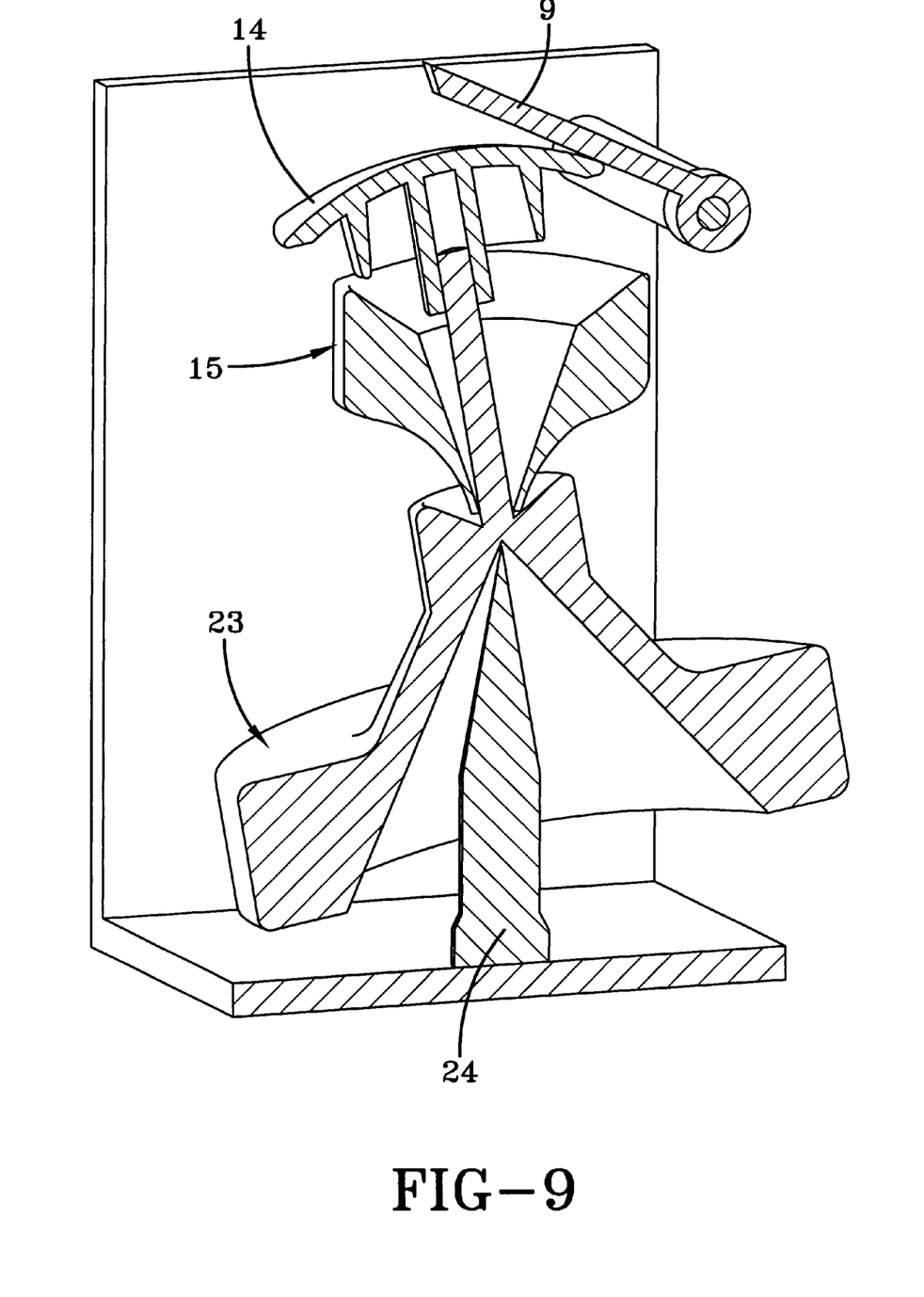
FIG. 9 shows the inertia sensor from FIG. 1 under decelerating conditions.

The inertia sensor 7 is triggered when the inertia sensor 7 experiences decelerated motion. Under decelerating conditions, the primary mass 23 and the secondary mass 15 tilt. In the embodiment represented in FIG. 9, the primary mass 23 and the secondary mass 15 tilt in essentially the same direction resulting in the lifter 14 being raised. As mentioned earlier, the primary mass 23 tilts or swings about the pivot point defined by the tip 25 of the post 24. The secondary mass 15 tilts about the top surface 21 of the support member 20. The inertia sensor 7 is triggered in decelerating conditions because of relative angular displacement between the primary mass and the secondary mass. As the secondary mass 15 tilts, the secondary mass 15 applies a generally upward force on the lifter 14. The lifter 14 is lifted in a direction away from the secondary mass 15 because the lifter guide 26 controls the direction of lifter 14 ascent. The tubular portion 12 of the lifter 14 receives the lifter guide 26, which is connected to the primary mass 23. As the lifter 14 is being raised, the lifter guide 26 slides out of the tubular portion 12. Even at the maximum height of the lifter 14, a portion of the lifter guide 26 will remain within the tubular portion 12. The maximum height of the lifter 14 is achieved when the lifter 14 pushes the locking pawl 9 into engagement with a ratchet wheel. The triggering sensitivity in the present invention made be modified by altering the mass and geometry of the secondary mass.

Figure 10:
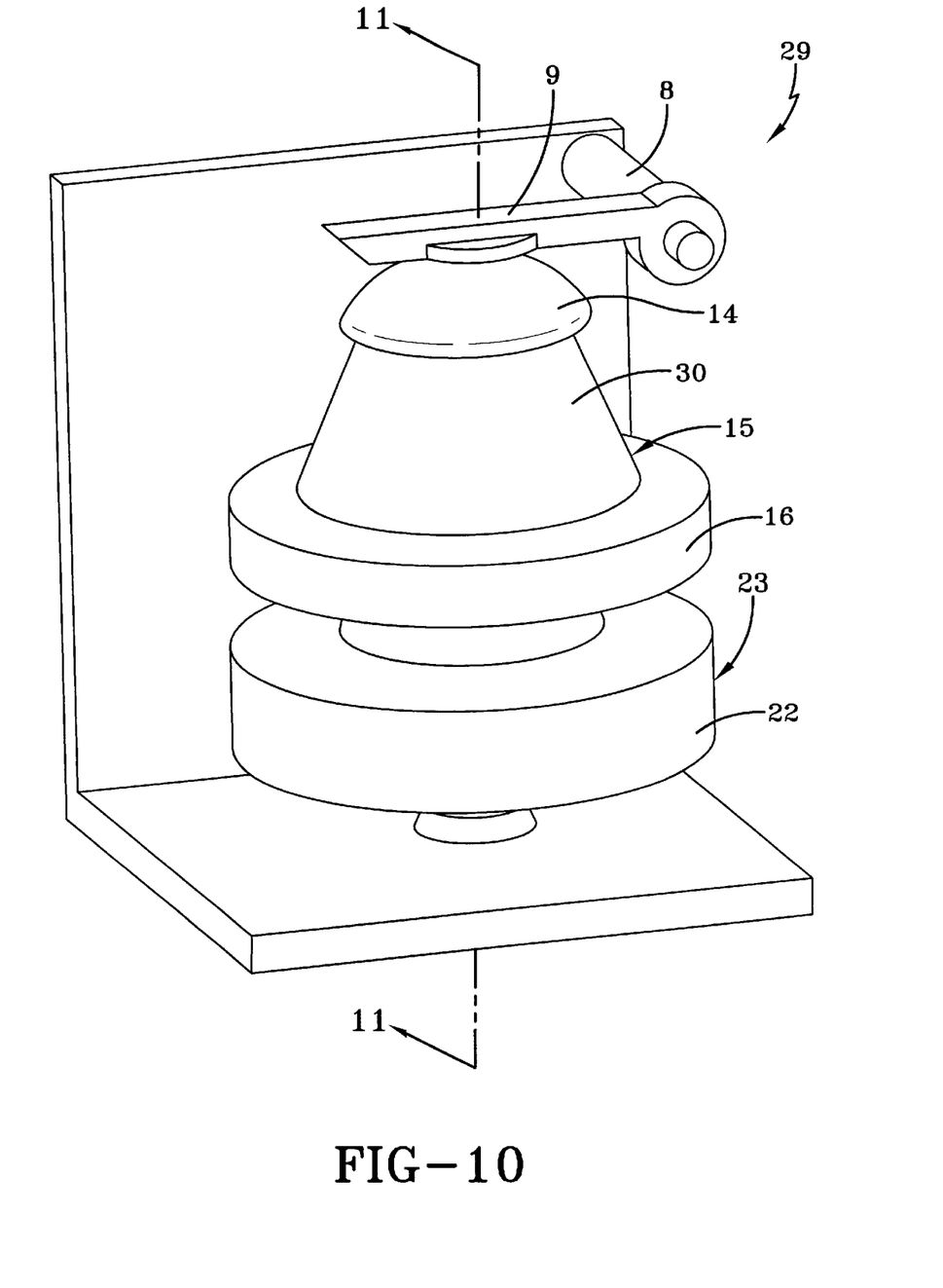
FIG. 10 shows an alternative embodiment for the inertia sensor.
Figure 11:
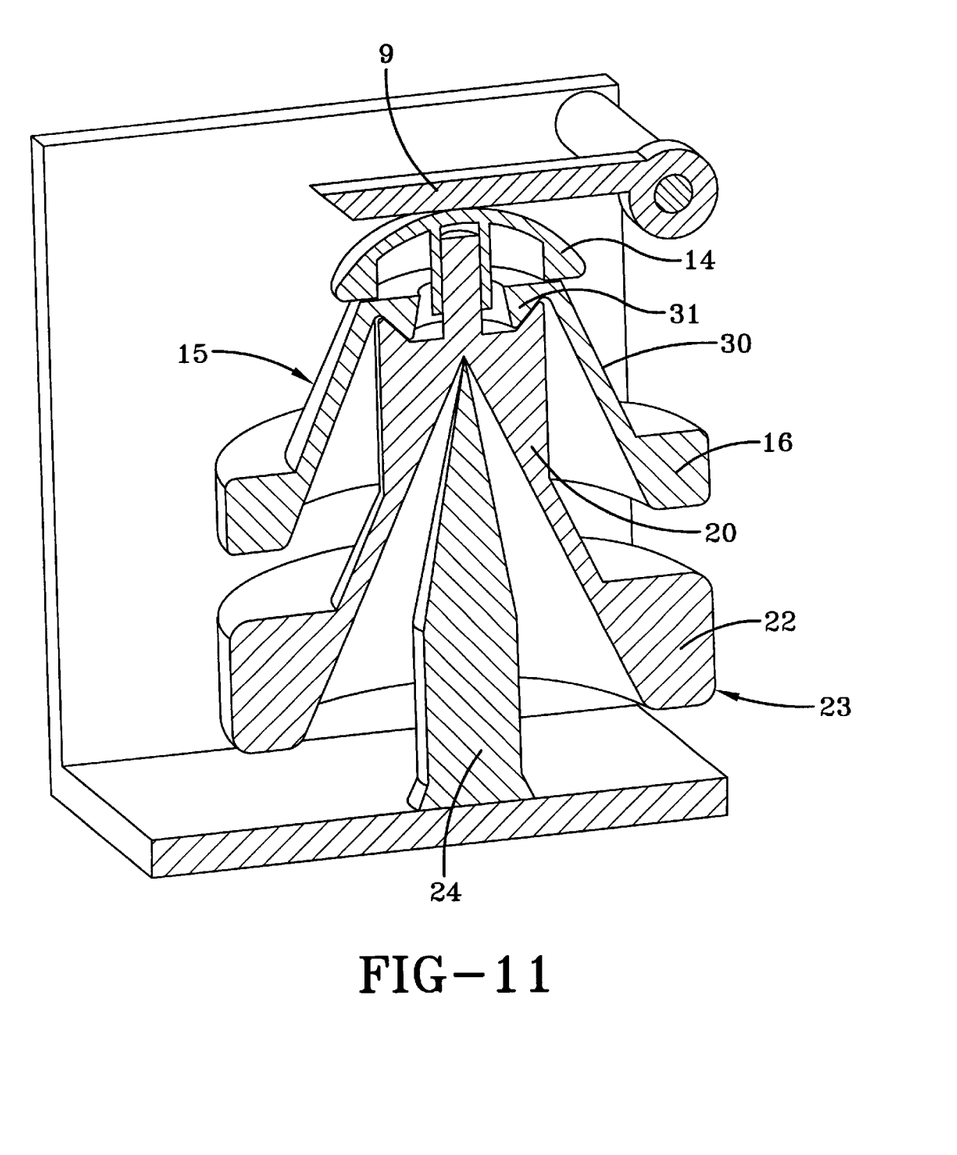
FIG. 11 shows a cross section view through section 11—11 of the inertia sensor depicted in FIG. 10.
Figure 12:
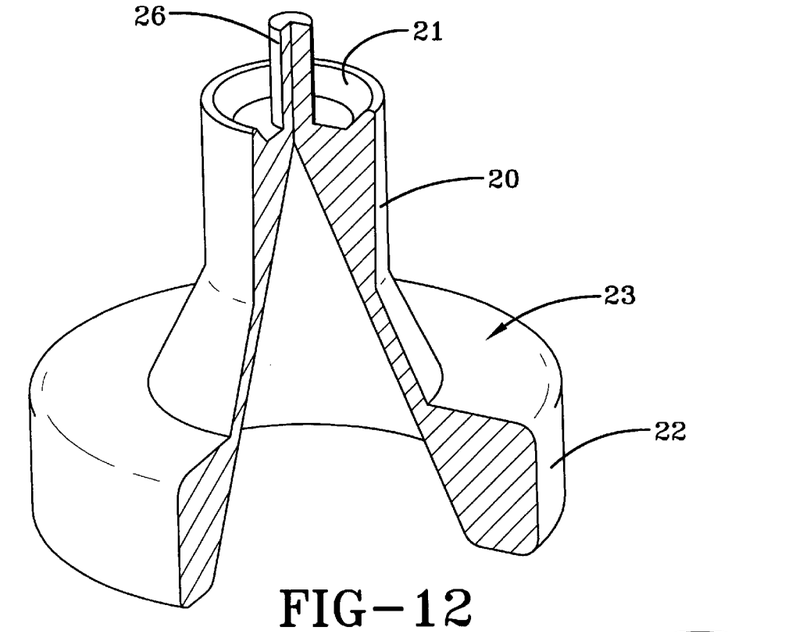
FIG. 12 shows a partial cross section view of the primary mass from the inertia sensor depicted in FIG. 10.
Figures 13, 14:
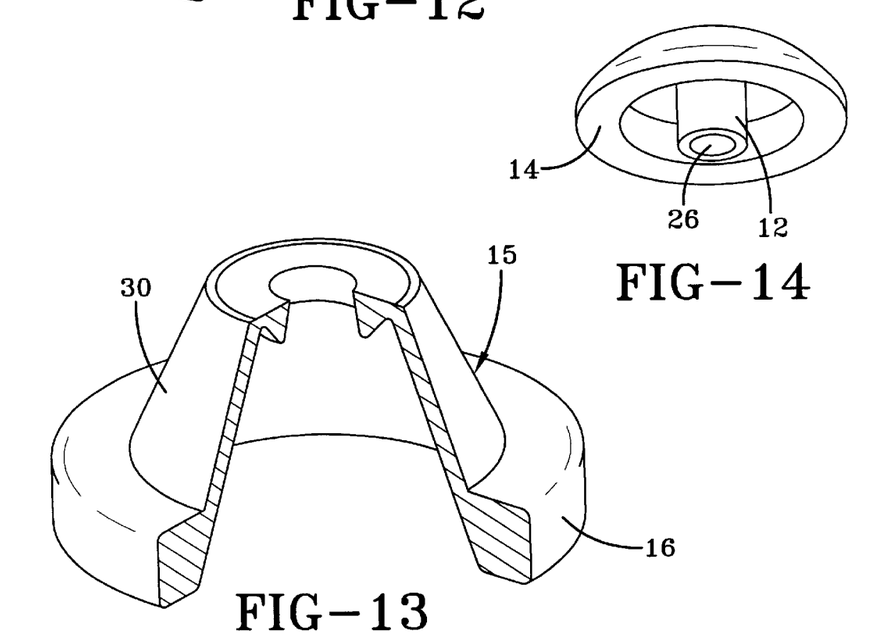
FIG. 13 shows a partial cross section view of the secondary mass from inertia sensor shown in FIG. 10.
FIG. 14 show a perspective view of a lifter from the inertia sensor in FIG. 10.

An alternate inertia sensor 29 is shown in FIG. 10, which has the same components as the inertia sensor 29 represented in FIG. 1. The inertia sensor 29 in FIG. 10 has a primary mass 23 (shown in FIG. 12), a secondary mass 15 (shown in FIG. 13), and a lifter 14 (shown in FIG. 14). The primary mass 23 provides the inertia for the self-compensating function, the secondary mass 15 provides the inertia for sensing deceleration, and during deceleration, the lifter 14 is raised to rotate the locking pawl 9. The main difference between the inertia sensor 29 in FIG. 10 and the inertia sensor 7 in FIG. 1 is the design of the secondary mass 15.

The secondary mass 15 has a secondary metal ring 16 and a tapered member 30. The metal ring is preferable made from a heavy metal or alloy material and the tapered member 30 is preferably made from a plastic material. The secondary metal ring 16 and the tapered member 30 may be connected by an interference fit, molding, gluing, or other suitable attachment means. The secondary metal ring 16 in the inertia sensor 29 in FIG. 10 is positioned below the tip 25 of the post 24 while the secondary metal ring 16 in the inertia sensor 7 shown in FIG. 1 is positioned above the tip 25 of the post 24. The tapered member 30 tapers inward from the metal ring. The lip of the tapered member rests on the top surface 21 of the support member 20, and the lip has a shape that is complimentary to the shape of the outer portion of the top surface 21 of the support member 20.

Figure 15:
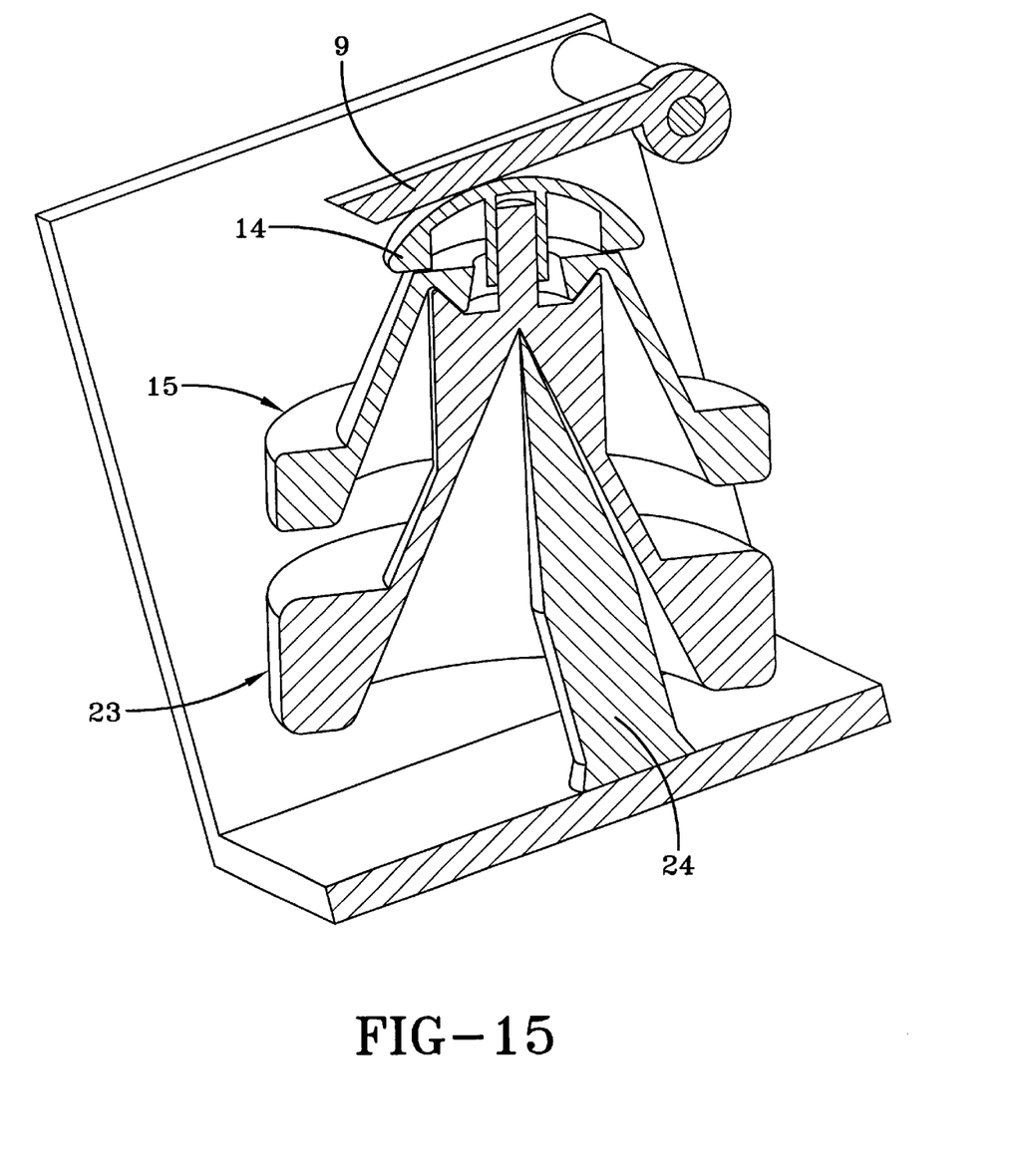
FIG. 15 shows the inertia sensor from FIG. 10 subjected to a tilting angle.
Figure 16:
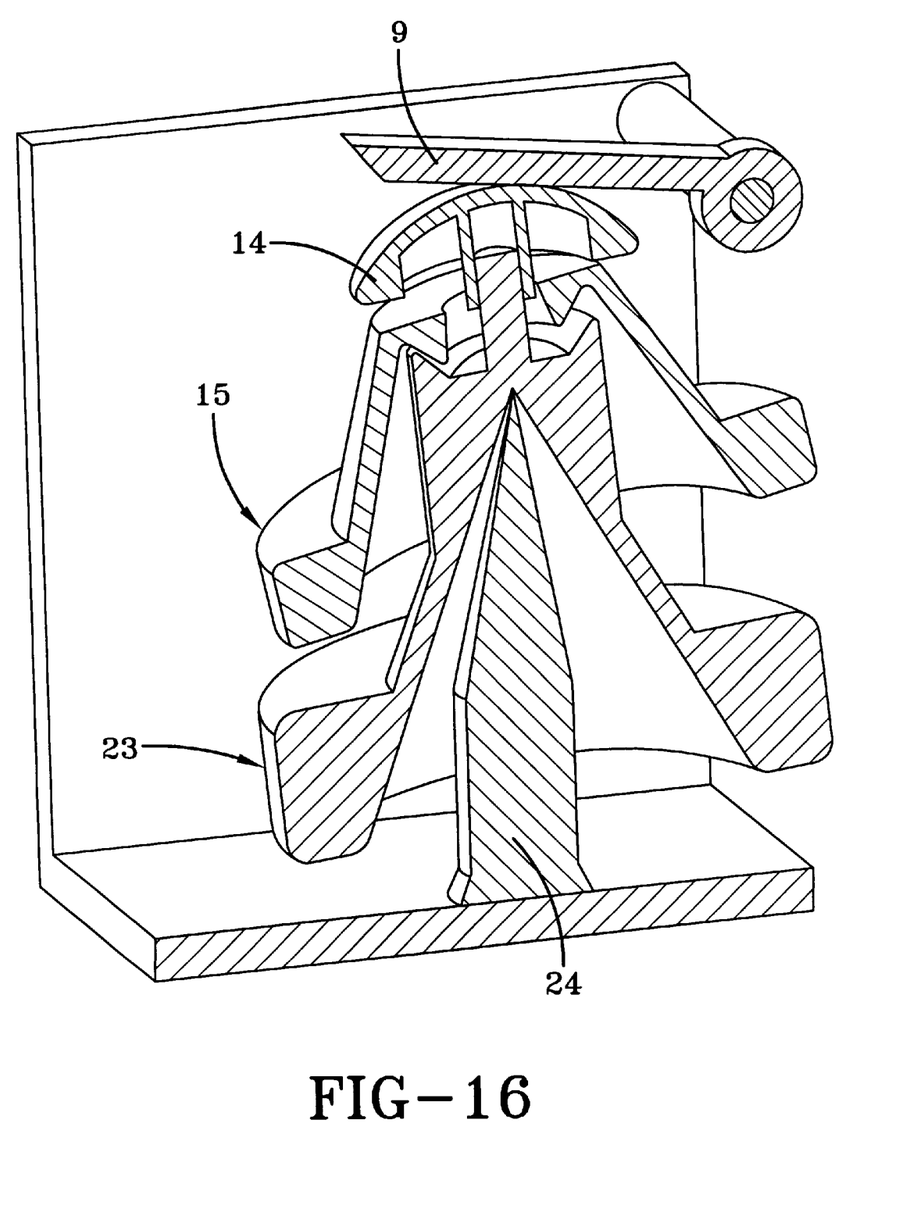
FIG. 16 shows the inertia sensor from FIG. 10 under decelerating conditions.

The operation of the second embodiment for the inertia sensor 29 operates in substantially the same manner as the first embodiment. FIG. 15 shows inertia sensor 29 subjected to a tilting angle. FIG. 16 shows the inertia sensor 29 placed in decelerating conditions.

From the above description of the invention, those skilled in the art will perceive improvements, changes, and modifications. Such improvements, changes and modifications within the skill of the art are intended to be covered by the appended claims.

I claim:

1. A seatbelt retractor having an inertia sensor for sensing vehicle deceleration, the inertia sensor comprises
    a primary mass providing an inertia for self compensating the inertia sensor during a tilting of the seatbelt retractor and
    a secondary mass resting directly on the primary mass, the secondary mass provides an inertia for sensing deceleration, wherein the primary mass and the secondary mass have a common central axis, wherein the primary mass has a support member for supporting the secondary mass, wherein the primary mass has a lifter guide extending from a center of the support member.

2. The seatbelt retractor according to claim 1 further comprising a bracket for housing the inertia sensor, the bracket comprises an axle extending from a side portion of the bracket and a post connected to a bottom portion of the bracket.

3. The seatbelt retractor according to claim 2 wherein the seatbelt retractor further comprises a locking pawl rotationally attached to the axle, wherein triggering the inertia sensor results in the locking pawl rotating into an engaged position with a ratchet wheel to initiate the locking mechanism of the seatbelt retractor.

4. The seatbelt retractor according to claim 2 wherein the primary mass has a metal ring constituting a bulk of the mass for the primary mass.

5. The seatbelt retractor according to claim 4 wherein the secondary mass has a metal ring and a funnel shaped member, wherein the secondary mass is hollow and the lifter guide passes therethrough.

6. The seatbelt retractor according to claim 5 wherein the secondary metal ring is disposed above a tip of the post.

7. The seatbelt retractor according to claim 5, wherein the secondary metal ring is disposed below a tip of the post.

8. The seatbelt retractor according to claim 5 wherein the funnel shaped member rests on a top surface of the support member; wherein the secondary mass is able to tilt in any direction.

9. The seatbelt retractor according to claim 1 wherein the inertia sensor further comprises a lifter disposed above the secondary mass, the lifter has a tubular portion for receiving the lifter guide, the lifter has a dome shaped configuration bulging in a direction away from the secondary mass, wherein when the seatbelt retractor is subjected to deceleration, the lifer rotates the locking pawl to initiate locking of the seatbelt retractor.

10. An inertia sensor for sensing deceleration comprising:
    a primary mass having a primary metal ring providing a bulk of the mass for the primary mass, the primary mass is balanced on a post extending from a seatbelt bracket,
    a secondary mass having a secondary metal ring providing a bulk of the mass for the secondary mass, the secondary mass is balanced on the primary mass, wherein the primary metal ring is disposed below the secondary metal ring, and
    a lifter disposed above the primary mass for applying a torque to a locking pawl, the lifter rests on the secondary mass, wherein the rotation of the locking pawl initiates a locking mechanism of a seatbelt retractor.

11. The seatbelt retractor according to claim 10 wherein the primary mass has a lifter guide extending from a center of a support member.

12. The seatbelt retractor according to claim 11 wherein the secondary mass has a funnel shaped member, wherein the secondary mass is hollow and the lifter guide passes therethrough.

13. The seatbelt retractor according to claim 10 wherein the secondary metal ring is disposed above a tip of the post.

14. The seatbelt retractor according to claim 10, wherein the secondary metal ring is disposed below a tip of the post.

15. The seatbelt retractor according to claim 10 wherein the funnel shaped member rests on a top surface of the support member; wherein the secondary mass is able to tilt in any direction.

16. An inertia sensor comprising
a primary mass providing an inertia for self compensating the inertia sensor during a tilting of a frame and
a secondary mass resting directly on the primary mass, the secondary mass provides an inertia for sensing deceleration, wherein the primary mass and the secondary mass have a common central axis, wherein the primary mass has a support member for supporting the secondary mass, wherein the primary mass has a lifter guide extending from a center of the support member.

17. The inertia sensor according to claim 16 wherein the bracket comprises an axle extending from a side portion of the bracket and a post connected to a bottom portion of the bracket.

18. The inertia sensor according to claim 17 wherein the primary mass has a metal ring constituting a bulk of the mass for the primary mass.

19. The inertia sensor according to claim 18 wherein the secondary mass has a metal ring and a funnel shaped member, wherein the secondary mass is hollow and the lifter guide passes therethrough.

20. The inertia sensor according to claim 19 wherein the funnel shaped member rests on a top surface of the support member, wherein the secondary mass is able to tilt in any direction.

21. The inertia sensor according to claim 19 wherein the inertia sensor further comprises a lifter disposed above the secondary mass, the lifter has a tubular portion for receiving the lifter guide, the lifter has a dome shaped configuration bulging in a direction away from the secondary mass, wherein when the seatbelt retractor is subjected to deceleration, the lifter rotates a locking pawl to initiate locking of a seatbelt retractor.

22. An inertia sensor for sensing deceleration comprising:
a primary mass having a primary metal ring providing a bulk of the mass for the primary mass, the primary mass is balanced on a post extending from a bracket,
a secondary mess having a secondary metal ring providing a bulk of the mass for the secondary mass, the secondary mass is balanced on the primary mass, wherein the primary metal ring is disposed below the secondary metal ring, and
a lifter for applying a torque to a lever arm, the lifter is disposed above the primary mass and the secondary mass, wherein the lifter rests on the secondary mass.

23. The inertia sensor according to claim 22 wherein the primary mass has a lifter guide extending from a center of a support member.

24. The seatbelt retractor according to claim 23 wherein the secondary mass has a funnel shaped member, wherein the secondary mass is hollow and the lifter guide passes therethrough.

25. The seatbelt retractor according to claim 22 wherein the funnel shaped member rests on a top surface of the support member; wherein the secondary mass is able to tilt in any direction.

26. The inertia sensor according to claim 22 wherein the lever arm is attached to the bracket and the bracket is attached to a seatbelt retractor frame, wherein the rotation of the lever arm initiates a locking mechanism of a seatbelt retractor.

* * * * *